US009869359B2

United States Patent
McIlheran et al.

(10) Patent No.: US 9,869,359 B2
(45) Date of Patent: Jan. 16, 2018

(54) HYDRAULIC SYSTEM WITH AN UNLOADING VALVE

(71) Applicant: Caterpillar Inc., Peoria, IL (US)

(72) Inventors: Carl McIlheran, Channahon, IL (US); Andrew J. Kleitsch, Shorewood, IL (US); John C. Vacca, Joilet, IL (US); Daniel Mather, Lockport, IL (US); Michael D. Hudson, Mount Zion, IL (US); Derek W. Holmes, Tuscola, IL (US)

(73) Assignee: Caterpillar Inc., Peoria, IL (US)

( * ) Notice: Subject to any disclaimer, the term of this patent is extended or adjusted under 35 U.S.C. 154(b) by 678 days.

(21) Appl. No.: 14/473,124

(22) Filed: Aug. 29, 2014

(65) Prior Publication Data

US 2016/0061280 A1 Mar. 3, 2016

(51) Int. Cl.
*F16D 65/78* (2006.01)
*B60T 5/00* (2006.01)
*F15B 21/04* (2006.01)

(52) U.S. Cl.
CPC ............... *F16D 65/78* (2013.01); *B60T 5/00* (2013.01); *F15B 21/042* (2013.01); *F15B 2211/50518* (2013.01); *F15B 2211/5156* (2013.01); *F15B 2211/611* (2013.01); *F15B 2211/62* (2013.01); *F16D 2065/783* (2013.01)

(58) Field of Classification Search
CPC ............... F15B 21/04; F15B 21/042; F15B 2211/50518; F15B 2211/62; F15B 2211/5156; F15B 2211/5159; F16H 57/04; F16D 2065/783

USPC ..... 60/337, 456; 188/264 AA, 264 F, 264 R, 188/264 D, 264 P

See application file for complete search history.

(56) References Cited

U.S. PATENT DOCUMENTS

| 4,196,589 A | * | 4/1980 | Kato ................... B60T 13/12 188/264 D |
| 4,321,793 A | * | 3/1982 | Uranaka ................ B60T 1/08 60/358 |
| 4,517,800 A | * | 5/1985 | Karakama ............... B62D 5/07 180/403 |
| 5,813,309 A | | 9/1998 | Taka et al. |
| 5,975,257 A | * | 11/1999 | Roach .................. B62D 5/062 188/264 F |
| 6,959,726 B2 | | 11/2005 | Jervis et al. |
| 7,392,653 B2 | | 7/2008 | Sugano |
| 8,479,504 B2 | | 7/2013 | Kerckhove et al. |

(Continued)

FOREIGN PATENT DOCUMENTS

WO 2013031768 A1 3/2013
WO 2013112109 A1 8/2013

*Primary Examiner* — F. Daniel Lopez
*Assistant Examiner* — Dustin T Nguyen
(74) *Attorney, Agent, or Firm* — Miller, Matthias & Hull

(57) ABSTRACT

A relief valve in a hydraulic system in a machine selectively sends pressurized oil to both a brake cooling apparatus and a cylinder used to hoist a load. A relief valve lowers pressure spikes in a brake cooling line by dumping fluid in a brake cooling line to tank responsive to a pressure spikes at the head end of the cylinder during hoisting or other transitions in the hydraulic system. Reducing the pressure spikes in the brake cooling line improves reliability of the brake cooling apparatus by protecting seals from undue stresses.

13 Claims, 9 Drawing Sheets

(56) References Cited

U.S. PATENT DOCUMENTS 8,701,396 B2 4/2014 HNarotham et al.
2011/0197573 A1 8/2011 Honsbein

* cited by examiner

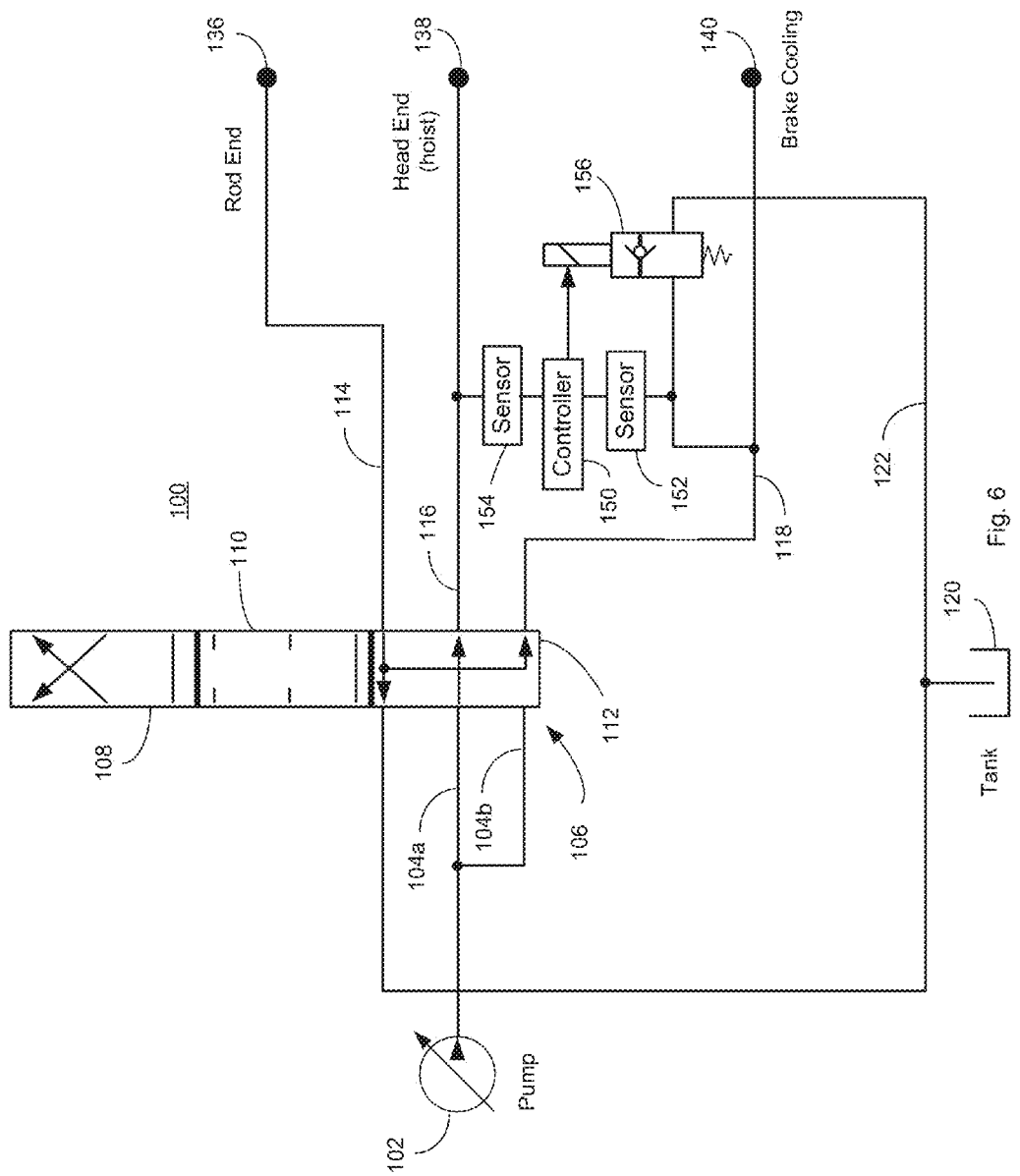

HYDRAULIC SYSTEM WITH AN UNLOADING VALVE

TECHNICAL FIELD

The present disclosure relates generally to a hydraulic system and more specifically to reducing pressure spikes in a brake oil cooling system.

BACKGROUND

Oil or other hydraulic fluid used to operate hydraulic systems, such as a truck bed hoist cylinder of a machine such as an off-road truck may also be used to cool the brakes of the machine. The oil may be circulated to one or more brake coolers by the main hydraulic pump except when the main hoist cylinder is activated to raise the truck payload bed. Upon demand, the oil flowing through the brake cooler may be redirected to the main hoist cylinder to raise the truck payload bed. This change in flow from the brake cooler to the main hoist cylinder and other changes in the flow path of oil or operation of the machine may cause a spike in fluid pressure, also known as an fluid hammer, in the brake cooler hydraulic circuit. This spike in fluid pressure has been linked to premature failure in seals in the brake cooler or related components.

WO 2013/112109 A1 (the "109 publication) discloses an unloading valve that uses two pilot orifices to prevent spool oscillations due to sudden pressure fluctuations. The 109 publication fails to teach an unloading valve that relieves pressure from a brake cooling line responsive to pressure changes in the cylinder end of a hoist hydraulic line.

SUMMARY

In one aspect, a hydraulic system includes a hoist cylinder having a rod end and a head end and a brake cooler having a brake cooler port configured to receive dispelled fluid from the rod end in response to pressurized fluid being directed to the head end to extend the hoist cylinder. The hydraulic system may also include an unloading relief valve in fluid communication with the rod end and the brake cooler port, the unloading relief valve being movable between a biased first position and a second position, in response to fluid being dispelled from the rod end to the brake cooler port and pressurized fluid being directed to the head end. The unloading relief valve is movable to the second position based on a signal pressure of the head end to allow the dispelled flow from the rod end to flow to a tank.

In another aspect, a hydraulic system in a machine having a hoist cylinder with a head end and a rod end includes a hydraulic valve configured in a biased first position and a second position that connects a first port and a second port, the hydraulic valve including a first signal pressure port and a second signal pressure port, wherein the hydraulic valve is urged to the second position by a predetermined pressure on either the first or second signal pressure ports. The hydraulic system may also include a first hydraulic line having a first end coupled to a brake cooling circuit and further coupled to both the first port and the first signal pressure port, the first hydraulic line having a second end selectively coupled via a hoist valve to one of a pump or a hoist cylinder rod end hydraulic line. The hydraulic system may also include a second hydraulic line coupled between a hoist cylinder head end hydraulic line and the second signal pressure port and a third hydraulic line coupled between the second port and a tank.

In yet another aspect, a method of operating a hydraulic system includes, responsive to a hoist valve in a raise position, providing pressurized fluid to a head end of a hoist cylinder and dispelling fluid from a rod end of a hoist cylinder to a port of the brake cooler, and moving an unloading relief valve to a position in response to a pressure of a head end of a hoist cylinder being above a threshold pressure to allow the dispelled fluid from the rod end to flow to a tank.

These and other benefits will become apparent from the specification, the drawings and the claims.

BRIEF DESCRIPTION OF THE DRAWINGS

FIG. 6 is a diagram of another embodiment of a hydraulic system suitable for use in the machine of FIG. 1.

DESCRIPTION

Figure 1:
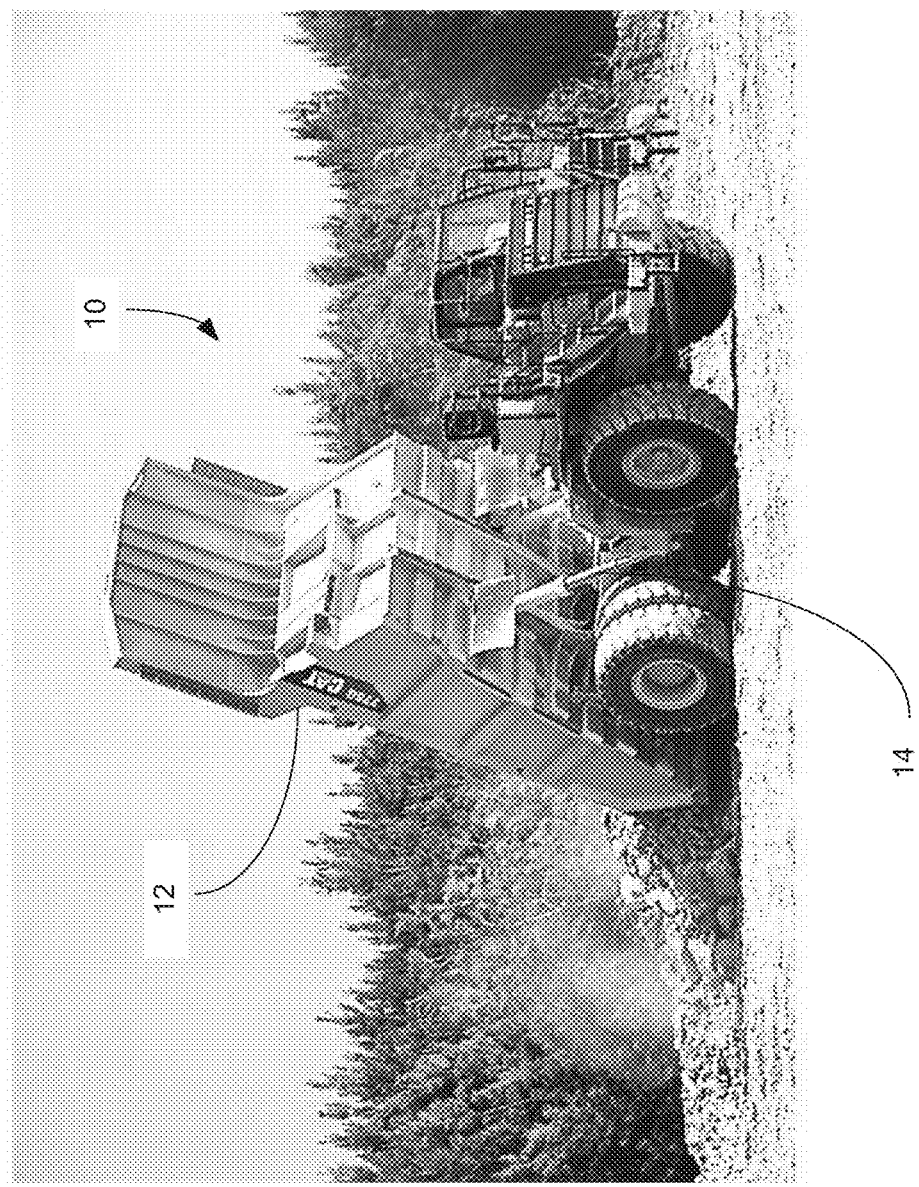
FIG. 1 is an illustration of an off-road machine.

FIG. 1 illustrates a machine 10 having a payload bed 12 that can be lifted by a hoist cylinder 14. In some applications there may be more than one hoist cylinder 14. The machine 10 may be used in a variety of applications including mining, road construction, construction site preparation, etc. More details about the machine 10 and in particular a hydraulic system associated with the machine 10 are discussed in more detail below.

Figure 2:
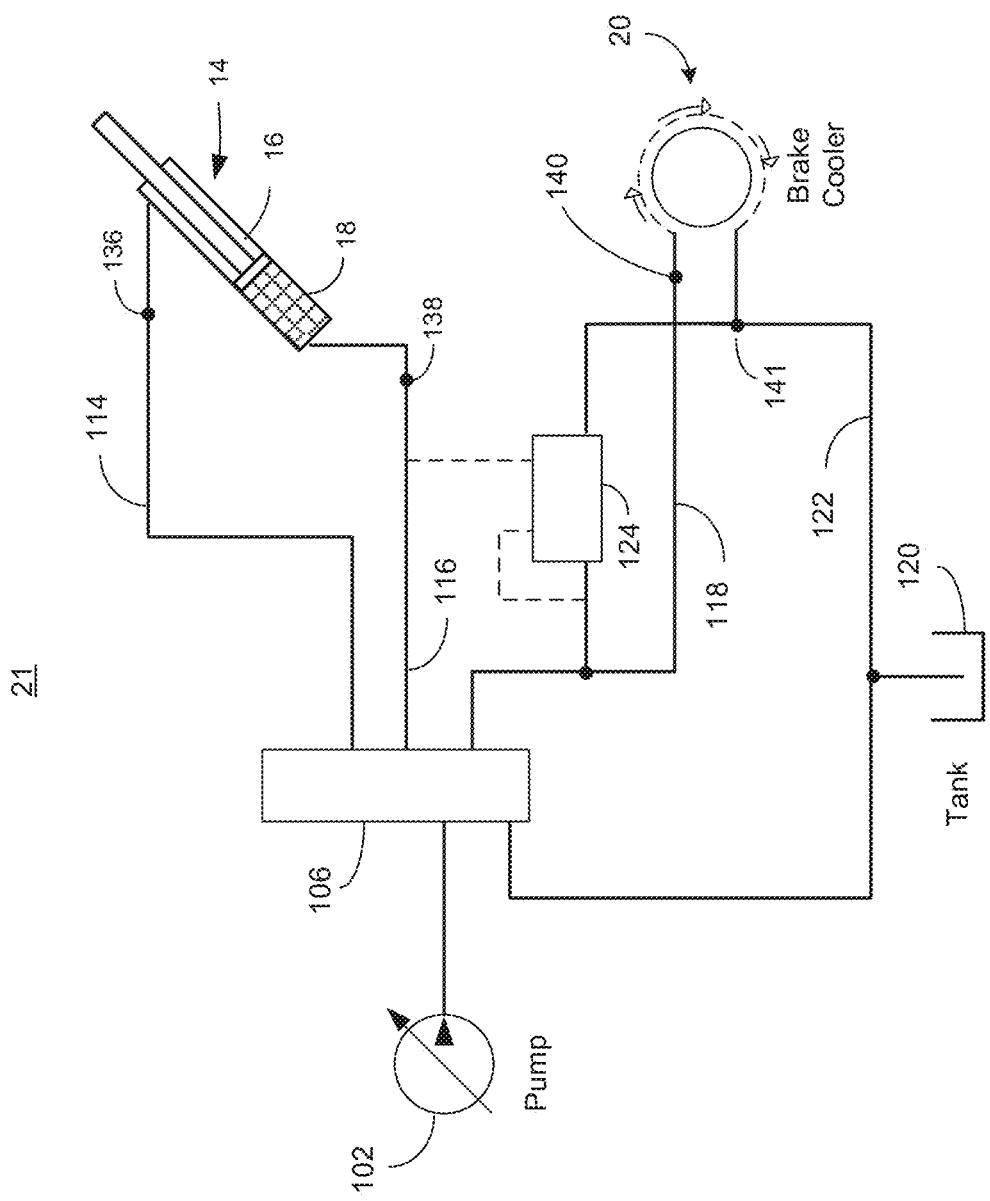
FIG. 2 is a diagram of a simplified hydraulic system suitable for use in the machine of FIG. 1.

FIG. 2 is a diagram of a hydraulic system 21 suitable for use in the machine 10. The illustrated hydraulic system 21 shows only component elements that are relevant to the current disclosure for the sake of simplicity and leaves out many elements commonly found in hydraulic systems of such machines including, but not limited to, additional pumps, safety relief valves, filters, counterbalance valves, additional cylinders, and auxiliary hydraulic units.

The hydraulic system 21 of FIG. 2 may include a pump 102 to provide pressurized fluid to the system, a hoist valve 106, also known as a hoist spool valve, to selectively direct pressurized flow from the pump 102 to hydraulic functions, such as the hoist cylinder 14. The hoist cylinder 14 has a rod end 16 and a head end 18 capable of receiving pressurized flow from the pump 102 through the hoist valve 106. The hoist valve 106 moves in a known fashion between positions to accommodate hydraulic connections between the elements of the hydraulic system 21. In an embodiment, the hoist valve 106 may include pilot pressure controls (not depicted) on each end of a spool that move the spool back and forth using pressurized fluid controlled by a joystick or other operator interface. In some embodiments, the spool may be moved by an electrohydraulic valve using electrical signals from a joystick control.

A tank 120 can be provided in the system 21 to receive flow from hydraulic functions, such as the hoist cylinder 14. In one example, a port 138 leading to the head end 18 is provided and coupled to the hoist valve 106 via a hydraulic line 116. Also, a port 136 leading to the rod end 16 is provided and coupled to the hoist valve 106 via a hydraulic line 114.

The hydraulic system 21 may also include a brake cooler 20 connected to the hoist valve 106 via a brake cooling line 118 at port 140. A port 141 may connect the brake cooler 20 to the tank 120. In an embodiment, the pump 102 may supply hydraulic fluid, or oil, to the brake cooler 20 when the hoist cylinder 14 is not in use. When the pump 102 is in use, for example, when the hoist cylinder 14 is actively lifting the payload bed 12 using fluid directed into the head end 18, fluid being dispelled from the rod end 16 may be routed to the brake cooler 20 to extend the time during which brake cooling can take place. The dispelled fluid may be routed to the brake cooler 20 through the hoist valve 106. Discharge from the brake cooler 20 may carried to the tank 120 via a tank line 122. A relief valve 124 may be provided with the system 21. The relief valve 124 can be disposed in the brake cooling line 118 between the hoist valve 106 and the tank 120. The relief valve 124 can offer protection to the brake cooler 20 should the brake cooling line 118 experience a high pressure. The relief valve 124 may also be used to limit pressure spikes created on the brake cooling line 118 under circumstances discussed in more detail below.

Figure 3:
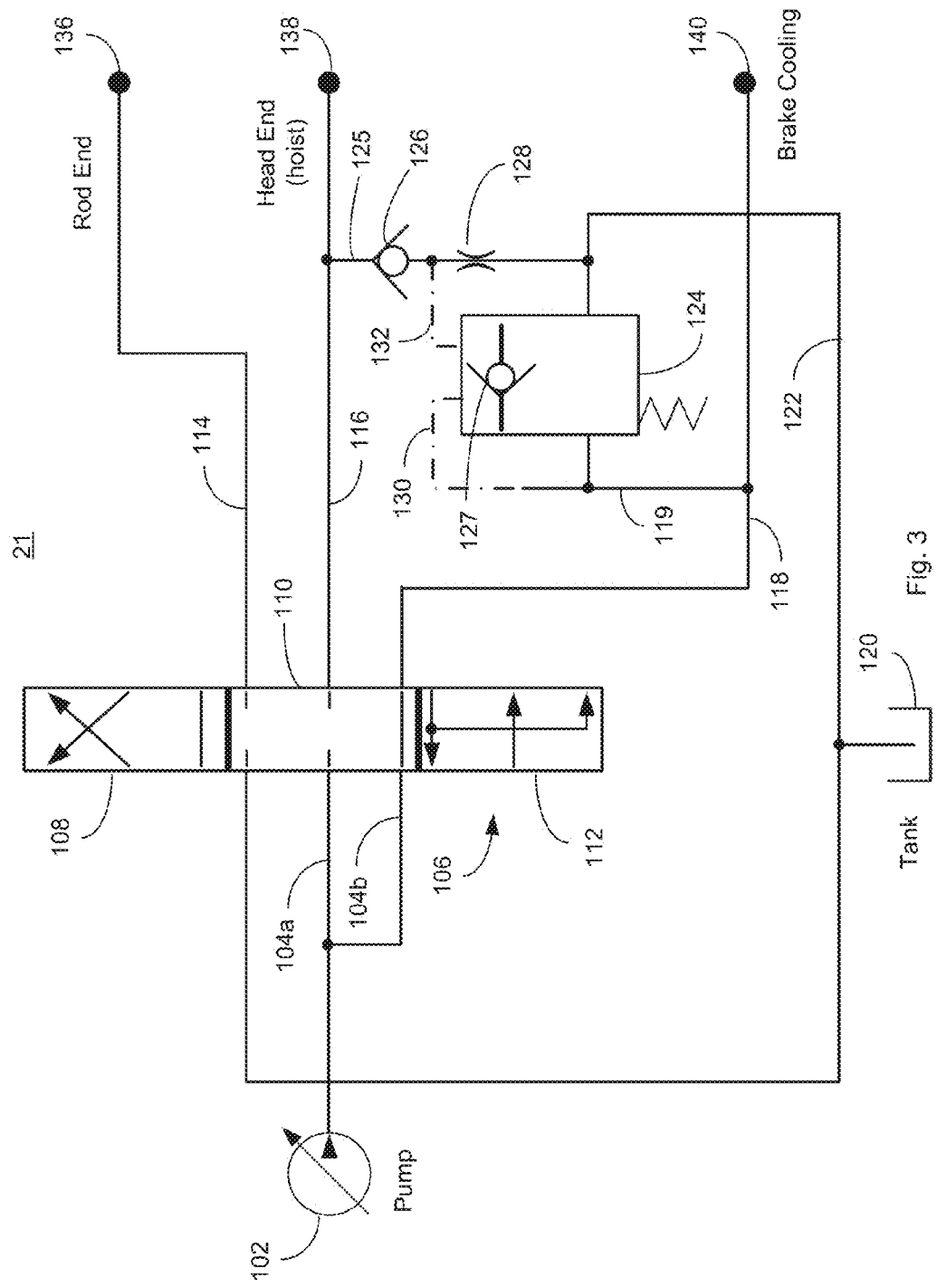
FIG. 3 is an alternate diagram of the simplified hydraulic system of FIG. 2 in a first state.

FIGS. 3-5 show different operating states of the hydraulic system 21. FIG. 3 shows additional detail of the hoist valve 106 illustrating various exemplary positions including a lower position 108, a hold position 110, and a raise position 112. The pump 102 may be coupled to the hoist valve 106 at more than one location as depicted by lines 104a and 104b. The line 114 may connect the hoist valve 106 to the rod end port 136 and the line 116 may connect the hoist valve 106 to the head end port 138.

As illustrated in FIG. 3, the hoist valve 106 is set in the hold position 110 so that both the rod end hydraulic line 114 and the head end line 116 are disconnected from the pump in order to maintain the hoist cylinder 14 at its current position. While in the hold position 110, the hoist valve 106 connects the pump 102 to the brake cooling port 140 to provide cooling to the brake cooler 20 (FIG. 2).

FIG. 3 also illustrates additional detail about the unloading relief valve 124. The valve 124 includes an inlet port fluidly coupled to the line 118 via line 119, and outlet port coupled to line 122. Also, the valve 124 is biased in the closed position by a spring located on one side of the valve 124. When moved to the open position, an internal passage couples the inlet and outlet ports to allow variable flow (0-100%) based on the position of the valve 124. A signal pressure line 130 is coupled to the inlet port to communicate the pressure of the line 118 to the side of the valve opposite the spring. A line 125 is provided to communicate the pressure of the line 116 to the outlet port and the line 122. A second signal line 132 is coupled to the line 125 to communicate the pressure of the line 116 to the side of the valve opposite the spring. A check valve 126 can be provided to the line 125. In an embodiment, another check valve 127 disposed in the valve 124 may allow flow only in the direction of the tank and prevent pressurized fluid in the tank line 122 from passing into the line 118.

An orifice 128 can be provided to line 125. The orifice 128 can restrict flow through the check valve 126 in a known manner so that the signal line 132 is able to activate the unloading relief valve 124 at a given pressure or flow rate. The unloading relief valve 124 may be set to respond to a first threshold pressure applied at the signal line 130 and a second threshold pressure applied to the additional signal line 132. In some embodiments, the first and second threshold pressures may be the same.

Figure 4A:
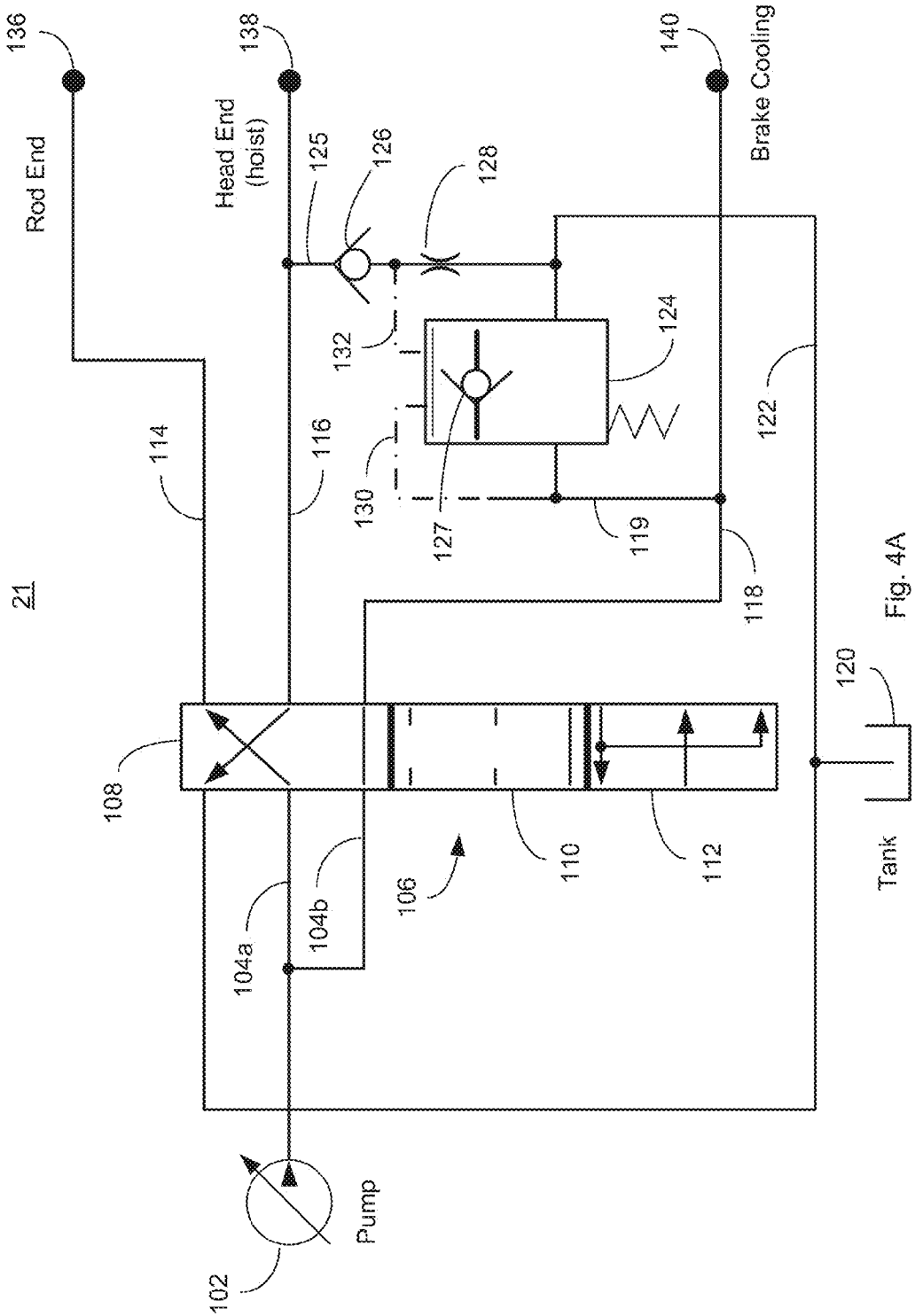
FIG. 4A is an alternate diagram of the simplified hydraulic system of FIG. 2 in a second state with an unloading valve closed.

FIG. 4A illustrates the hydraulic system 21 with the hoist valve 106 set to the lower position 108 so that the head end port 138 is connected to the tank 120, the pump 102 is connected to the rod end port 136 as well as the brake cooling port 140. Because lowering the empty payload bed 12 is substantially easier than raising the payload bed 12 when loaded, the pump 102 is generally capable of supplying fluid to both the rod end 16 as well as the brake cooler 20.

Figure 4B:
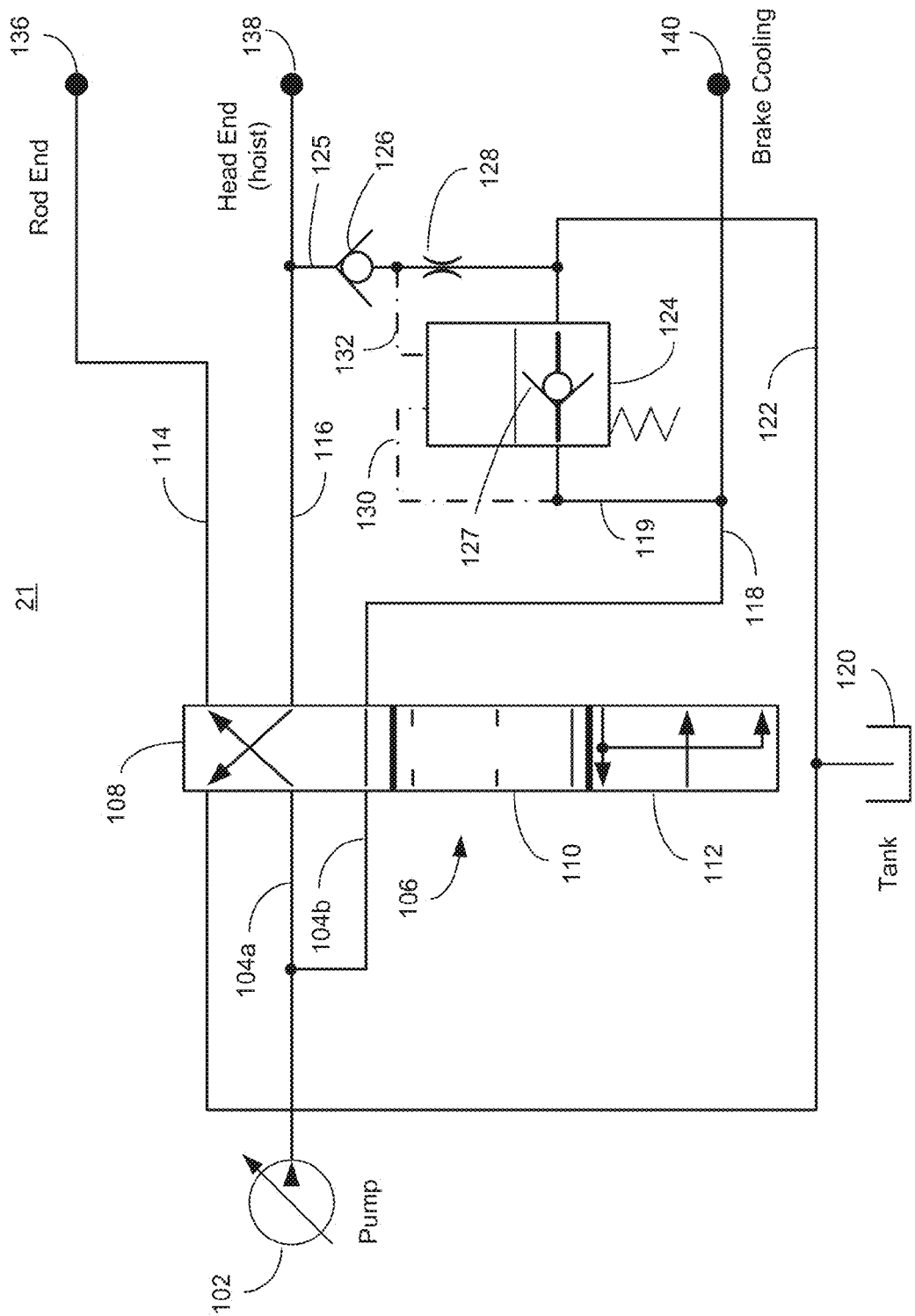
FIG. 4B is an alternate diagram of the simplified hydraulic system of FIG. 4A with the unloading valve open.

FIG. 4B illustrates the hydraulic system 21 shown in FIG. 4A with the unloading relief valve 124 in the open position so that fluid in the line 118 is shunted to tank 120. This state of the unloading relief valve 124 may be in response to a high enough pressure in the signal line 130, corresponding to a high pressure in the brake cooling line 118, to urge the valve 124 into the open position. This state of the unloading relief valve 124 may also be in response to an impulse or fluid hammer in the head end line 116 that causes sufficient pressure in the signal line 132 to urge the valve 124 open.

In an embodiment, the functions of the unloading relief valve 124 may be separated into two valves, one that only functions as a relief for high pressure in the brake cooling line 118, and another valve that unloads the brake cooling line in response to high pressure on the head end line 116.

Figure 5A:
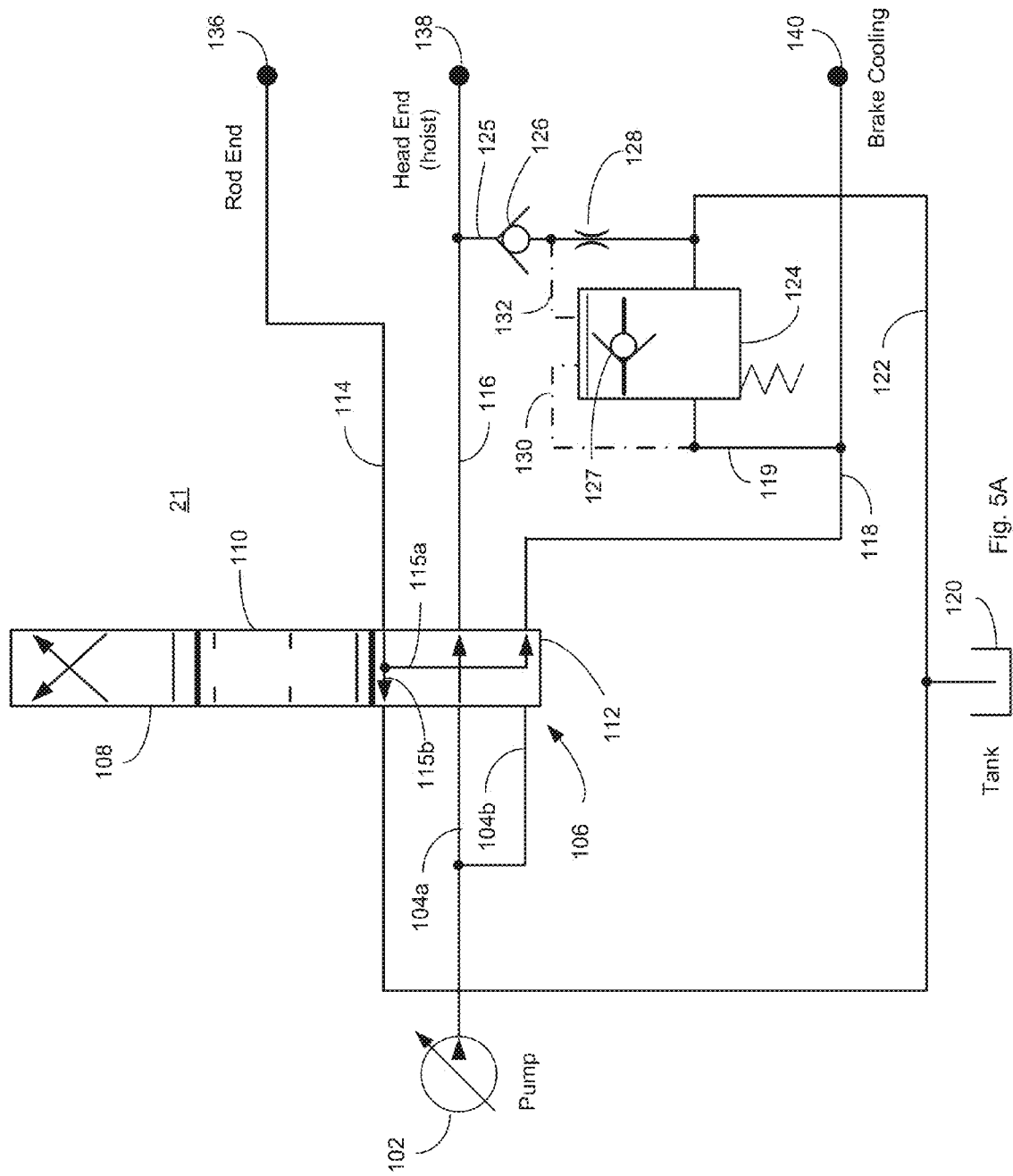
FIG. 5A is an alternate diagram of the simplified hydraulic system of FIG. 2 in a third state with an unloading valve closed.
Figure 5B:
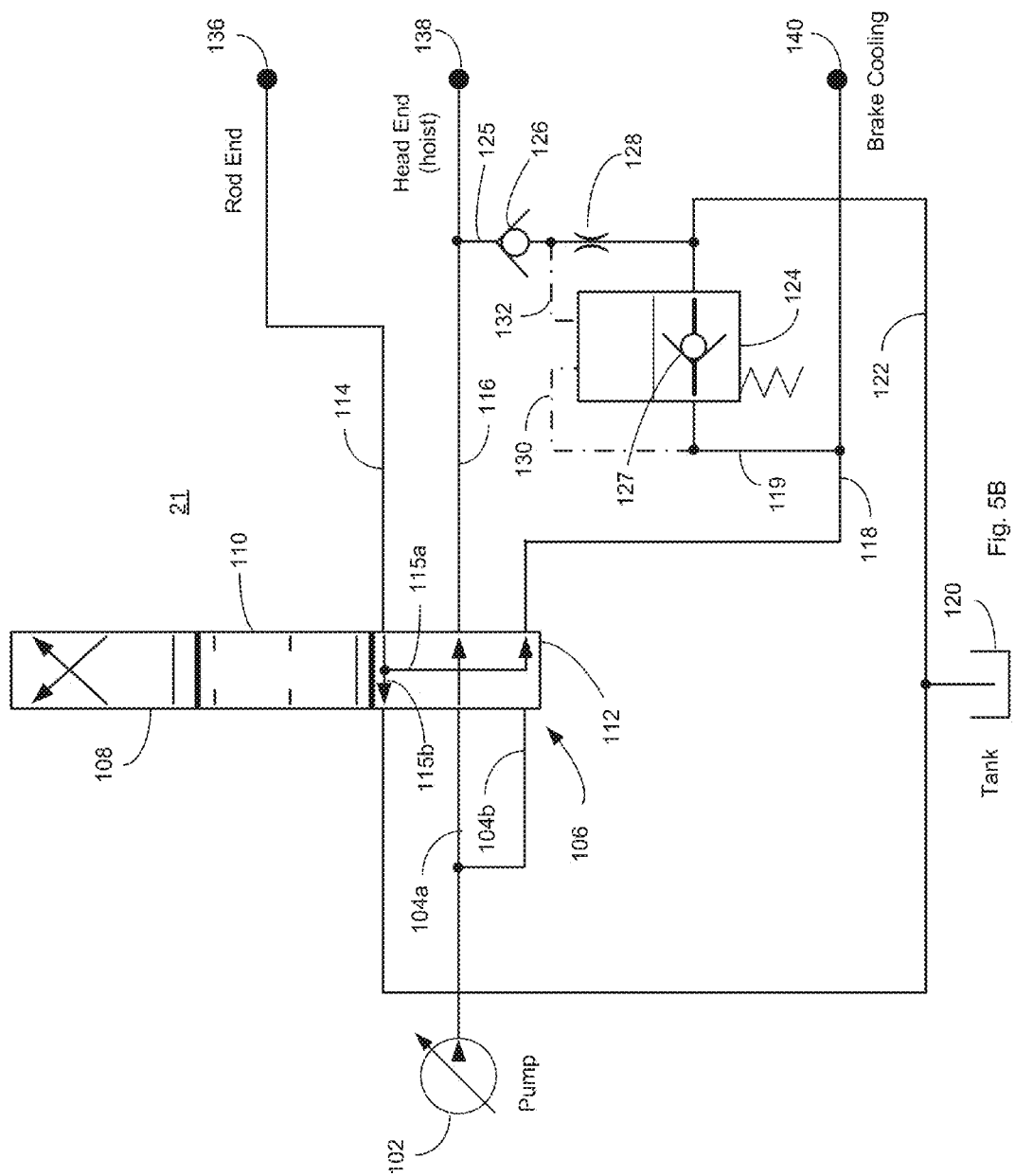
FIG. 5B is an alternate diagram of the simplified hydraulic system of FIG. 5A with the unloading valve open.

FIGS. 5A and 5B illustrates the hydraulic system 21 with the hoist valve 106 set to the raise position 112. In this state, the pump 102 is connected to the head end port 138 and the rod end port 136 is connected to the brake cooling port 140 via line 115a as well as the tank 120 via line 115b. In some embodiments the rod end port 136 is only connected to the brake cooling portion 140 via the hoist valve 106 and line 115a where line 115b is not present. In either embodiment, the oil dispelled from the rod end 16 may be used to provide additional brake cooling during payload bed 12 hoist operations even though the pump 102 is not connected to the brake cooling line 118. As illustrated in FIG. 5A, there may be times, either at when initially connected or during some portions of the hoist cycle such as when a load shifts, the unloading relief valve 124 may be in the closed position. In most cases, after pressure builds in the head end line 116, the unloading relief valve 124 will be open during the hoist cycle.

FIG. 5B illustrates the hydraulic system 21 shown in FIG. 5A with the unloading relief valve 124 in the open position so that fluid in the line 118 is shunted to tank 120. This state of the unloading relief valve 124 may be in response to a high enough pressure in the signal line 132, corresponding to a high pressure in the head end line 116 to urge the valve 124 into the open position.

As illustrated in FIGS. 3-5, when pressure in the brake cooling line 118 exceeds a threshold pressure of the unloading relief valve 124, pressure in line 130 urges the unloading relief valve 124 from a first biased position to a second, open, position. The valve 124 in the open position can allow oil to flow from brake cooling line 118 through the valve 124 to the tank 120, preventing damage to the brake cooler 20 resulting from sustained high pump pressure or the like.

Beyond that, several points in the payload bed 12 unloading cycle may cause transient high pressure spikes to occur in the hydraulic system 21 that cause a hydraulic hammer condition (referred to herein as a fluid hammer) sometimes associated with a rise in head end line 116 pressure before flow starts in the brake cooling line 118. For example, transient pressure spikes in the head end line 116 may occur at the initiation of a payload bed 12 raise, at some point during a payload bed 12 raise such as when a load slides from the payload bed 12, when the payload bed 12 reaches maximum height, at some point during the payload bed 12 lower phase such as when a weight transfer of the payload bed 12 itself compresses the hoist cylinder 14, or when the payload bed 12 fully drops to its corresponding support on the machine frame.

Even though the brake cooling line 118 may not be directly connected to either the pump 102 or the head end hydraulic line 116 when some of these transients occur, the resulting fluid hammer may be transmitted via the rod end hydraulic line 114 and/or the hoist valve 106. Because the signal line 130 that activates the unloading relief valve 124 for over pressure conditions is essentially in a parallel relationship with the line 119 and the brake cooler 20, the unloading relief valve 124 may not be activated by an fluid hammer in the signal line 130 in time to prevent or mitigate the fluid hammer from reaching the brake cooler 20. This pressure spike or fluid hammer may cause premature wear on the seals of the brake cooler 20.

Without regard to how the fluid hammer is transmitted to the brake cooling line 118, the presence of a pressure spike on the head end line 116 can indicate the subsequent occurrence of the fluid hammer in the brake cooling line 118. The signal line 132, being responsive to pressure spikes on the head end line 116 therefore allows the unloading relief valve 124 to activate and connect the brake cooling line 118 to the tank line 122 in time to shunt an fluid hammer associated with such a pressure spike before it reaches the brake cooler 20.

While it may be desirable to have the unloading relief valve 124 respond to a pressure spike at the signal line 132 and open as fast as possible, the sudden closing of the unloading relief valve 124 may generate a transient pressure spike of its own. So, the unloading relief valve 124 may be dampened so that the valve 124 will open quickly and close slowly. In one embodiment, the pressure in line 132 that causes the valve 124 to open may only be bled off through orifice 128, so that high pressure in the head end line 116 causes the valve 124 to open quickly, but when the pressure in the head end line 116 is reduced, the valve 124 will close slowly as fluid is discharged through the orifice 128 to tank.

FIG. 6 illustrates another embodiment of a hydraulic system 100 similar in many respects to the hydraulic system 21 that may also be suitable for preventing or limiting fluid hammer damage to a brake cooler 20. In this embodiment, a controller 150 in communication with a first pressure sensor 152 and a second pressure sensor 154 may control an electrohydraulic valve 156 to provide protection for over pressure situations as well as pressure-spike related fluid hammers. In this embodiment, high pressure on the brake cooling line 118 may be sensed by the sensor 152 and the electrohydraulic valve 156 may be opened in order to connect the brake cooling line 118 to the tank 120. Similarly, the sensor 154 may be sensitive to pressure spikes occurring on the head end hydraulic line 116 so that the controller 150 may cause the electrohydraulic valve 156 to open prior to an associated fluid hammer reaching the brake cooling port 140 and subsequently the brake cooler 20.

INDUSTRIAL APPLICABILITY

The use of an unloading relief valve 124 configured to operate in response to pressure in a hoist cylinder head end hydraulic line 116 protects a brake cooler 20 from pressure spikes that can damage seals and cause a machine 10, such as an off-road large truck, costly downtime.

Figure 7:
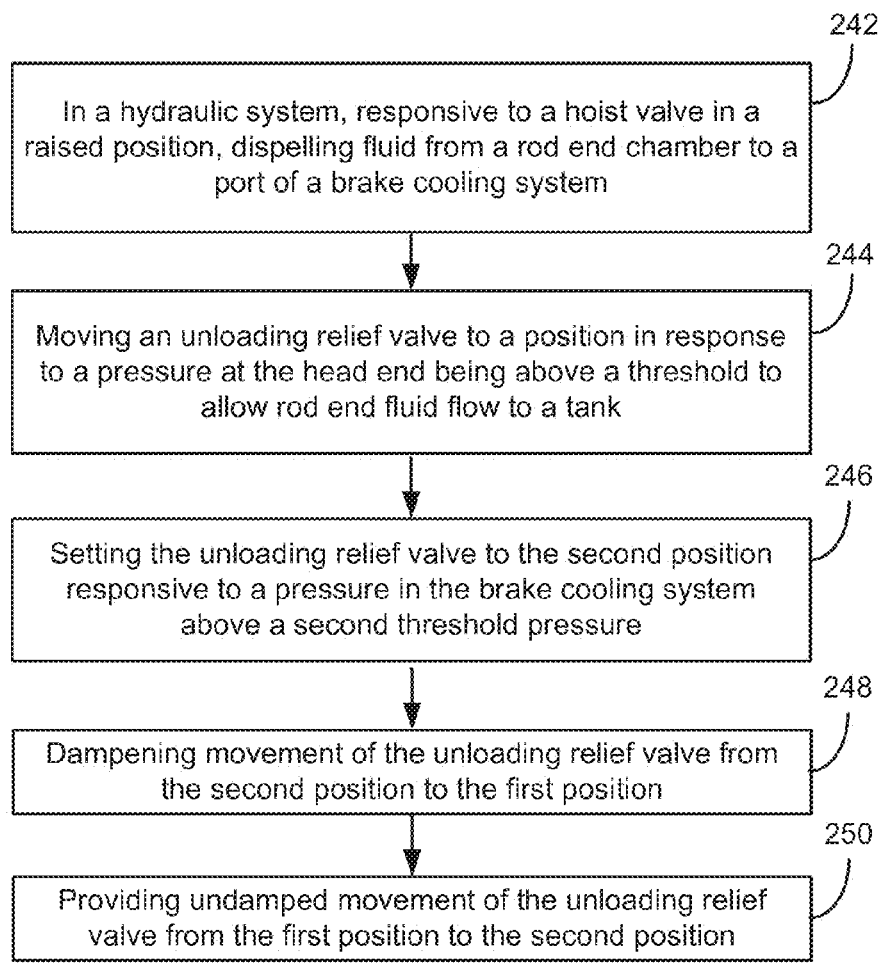
FIG. 7 is a flowchart of a method of operating a hydraulic system.

FIG. 7 is a method 240 of operating a hydraulic system 21, 100. The method 240 helps reduce pressure spikes or fluid hammers from propagating through the hydraulic system 21, 100 to a brake cooler 20 and therefore protects seals in the brake cooler circuit.

At a block 242, a machine 10, such as an off-road truck using in mining or construction operations, may have a hydraulic system 21. Responsive to a hoist valve 106 being in the raised position, dispelling fluid from the rod end 16 to a port 140 of the brake cooler 20.

At a block 244, moving an unloading relief valve 124 to a position in response to a pressure at the head end 18 of a hoist cylinder or a head end hydraulic line 116 being above a threshold pressure to allow rod end fluid flow to a tank 120. Setting the unloading relief valve 124 to the second position may include providing a signal line 132 from the head end 18 or the head end hydraulic line 116, to a signal pressure port of the unloading relief valve 124, wherein the signal line 132 connection includes a check valve 126 that prevents reverse flow into the head end 18 or its associated hydraulic line 116.

At a block 246, the unloading relief valve 124 may also be set to the second position responsive to a pressure in the brake cooling line 118 above a second threshold pressure. This protects the brake cooler 20 from high pressure in the brake cooling line 118 unrelated to pressure spikes in the head end line 116. In various embodiments, the pressures at signal pressure lines 130 and 132 required to move the unloading relief valve 124 from the biased first position to the second position may be the same or may be different.

At a block 248, optionally movement of the unloading relief valve 124 may be dampened when moving from the second position back to the biased first position. This may reduce the introduction of additional pressure spikes or fluid hammers caused solely by a chance in flow in the brake cooling line 118. At a block 250, movement of the unloading relief valve 124 from the biased first position to the second position may have no damping so the unloading relief valve 124 may open as quickly as possible to intercept an fluid hammer propagating through the hydraulic system 21.

The use of an unloading relief valve 124 configured to respond to sources of pressure spikes in relatively remote hydraulic circuits provides increased reliability for any seals and other wear components that are otherwise subject to these pressure spikes. While applicable in the above disclosed embodiment of a brake cooling environment, use for fans, motors, other coolers, transmissions, etc. are equally applicable.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A hydraulic system comprising:
   a hoist cylinder having a rod end and a head end;
   a brake cooler having a brake cooler port;
   a hoist valve including a raise position, the raise position of the hoist valve configured to provide pressurized fluid to the head end of the hoist cylinder and fluidly connect the rod end of the hoist cylinder with the brake cooler port of the brake cooler such that the brake cooler port of the brake cooler receives dispelled fluid from the rod end in response to pressurized fluid being directed to the head end to extend the hoist cylinder;

an unloading relief valve in fluid communication with the rod end and the brake cooler port, the unloading relief valve being movable between a biased first position and a second position, in response to fluid being dispelled from the rod end to the brake cooler port and pressurized fluid being directed to the head end, the unloading relief valve is movable to the second position based on a signal pressure of the head end to allow the dispelled flow from the rod end to flow to a tank;

wherein the unloading relief valve has a first signal pressure port coupled to a head end hydraulic line that supplies the signal pressure of the head end to the unloading relief valve; and wherein a connection between the first signal pressure port and the head end hydraulic line includes a check valve that prevents flow from the unloading relief valve to the head end.

2. The hydraulic system of claim 1, wherein the connection between the check valve and the tank include an orifice, where the first signal pressure port is coupled between the check valve and the orifice.

3. The hydraulic system of claim 1, wherein the unloading relief valve has a second signal pressure port coupled to a brake cooler hydraulic line.

4. The hydraulic system of claim 1, wherein the unloading relief valve permits flow only toward the tank.

5. A method of operating a hydraulic system comprising:

responsive to a hoist valve in a raise position, providing pressurized fluid to a head end of a hoist cylinder and dispelling fluid from a rod end of the hoist cylinder to a port of the brake cooler;

providing an unloading relief valve, the unloading relief valve moveable between a biased first position and a second position;

moving the unloading relief valve from the biased first position to the second position in response to a pressure of the head end of the hoist cylinder being above a threshold pressure to allow the dispelled fluid from the rod end to flow to a tank;

wherein moving the unloading relief valve to the second position comprises providing a signal pressure line from the head end to a signal pressure port of the unloading relief valve; and wherein the signal pressure line includes a check valve that prevents flow from the unloading relief valve to the head end.

6. The method of claim 5, further comprising:

dampening movement of the unloading relief valve from the second position to the biased first position.

7. The method of claim 6, further comprising:

providing undamped movement of the unloading relief valve from the biased first position to the second position.

8. The method of claim 5, further comprising moving the unloading relief valve to the second position responsive to a pressure in a brake cooling line above a second threshold pressure.

9. The method of claim 5, wherein providing pressurized fluid to the head end of the hoist cylinder and dispelling fluid from the rod end of the hoist cylinder to the port of the brake cooler further comprises dispelling fluid from the rod end to the tank via a rod-end to tank connection in the hoist valve.

10. A machine, comprising:

a payload bed;

a hydraulic system comprising a hoist cylinder having a rod end and a head end, the hoist cylinder configured to raise and lower the payload bed;

the hydraulic system further comprising;

a brake cooler having a brake cooler port;

a hoist valve including a raise position, the raise position of the hoist valve configured to provide pressurized fluid to the head end of the hoist cylinder and fluidly connect the rod end of the hoist cylinder with the port of the brake cooler such that the port of the brake cooler receives dispelled fluid from the rod end in response to pressurized fluid being directed to the head end to extend the hoist cylinder;

an unloading relief valve in fluid communication with the rod end and the brake cooler port, the unloading relief valve being movable between a biased first position and a second position, in response to fluid being dispelled from the rod end to the brake cooler port and pressurized fluid being directed to the head end, the unloading relief valve is movable to the second position based on a signal pressure of the head end to allow the dispelled flow from the rod end to flow to a tank;

wherein the unloading relief valve has a first signal pressure port coupled to a head end hydraulic line that supplies the signal pressure of the head end to the unloading relief valve; and wherein a connection between the first signal pressure port and the head end hydraulic line includes a check valve that prevents flow from the unloading relief valve to the head end.

11. The machine of claim 10, wherein the connection between the check valve and the tank include an orifice, where the first signal pressure port is coupled between the check valve and the orifice.

12. The machine of claim 10, wherein the unloading relief valve has a second signal pressure port coupled to a brake cooler hydraulic line.

13. The machine of claim 10, wherein the unloading relief valve permits flow only toward the tank.

* * * * *